US012117976B2

(12) United States Patent
Trocki et al.

(10) Patent No.: US 12,117,976 B2
(45) Date of Patent: Oct. 15, 2024

(54) SCHEMA BASED DATA BUFFERING AND PROCESSING ON A CLIENT DEVICE

(71) Applicant: Red Hat, Inc., Raleigh, NC (US)

(72) Inventors: Wojciech Trocki, Waterford (IE); Gianluca Zuccarelli, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 296 days.

(21) Appl. No.: 17/216,384

(22) Filed: Mar. 29, 2021

(65) Prior Publication Data

US 2022/0309044 A1    Sep. 29, 2022

(51) Int. Cl.
*G06F 16/21* (2019.01)
*G06F 16/215* (2019.01)
*G06F 16/23* (2019.01)
*G06F 16/245* (2019.01)
*G06F 16/27* (2019.01)

(52) U.S. Cl.
CPC .......... *G06F 16/212* (2019.01); *G06F 16/215* (2019.01); *G06F 16/2358* (2019.01); *G06F 16/2379* (2019.01); *G06F 16/245* (2019.01); *G06F 16/275* (2019.01)

(58) Field of Classification Search
None
See application file for complete search history.

(56) References Cited

U.S. PATENT DOCUMENTS

| 9,081,805 | B1 | 7/2015 | Stamen et al. |
| 9,436,502 | B2 | 9/2016 | Burckhardt et al. |
| 10,891,282 | B1 * | 1/2021 | Willingham ............ G06F 21/64 |
| 2019/0340287 | A1 * | 11/2019 | Tamjidi ................. G06F 16/242 |
| 2019/0370370 | A1 * | 12/2019 | Wittern ............. G06F 16/24556 |

FOREIGN PATENT DOCUMENTS

| CN | 109587212 A | 4/2019 |
| EP | 3564829 A1 | 11/2019 |

OTHER PUBLICATIONS

Tutorials Point, "GraphQL", 2018 e-book, Tutorials Point (I) Pvt. Ltd, 105 pages. (Year: 2018).*
Apollo GraphQL, "Managing Local State", indexed by the Internet Archive Wayback Machine on Jan. 25, 2021, 4 pages. (Year: 2021).*
Apollo GraphQL, "Reading and Writing Data to the Cache", indexed by the Internet Archive Wayback Machine on Jan. 25, 2021, 15 pages. (Year: 2021).*

(Continued)

*Primary Examiner* — Scott A. Waldron
(74) *Attorney, Agent, or Firm* — Womble Bond Dickinson (US) LLP

(57) ABSTRACT

Schema based data buffer and processing on a client device. A client device may obtain a schema for a set of data. The set of data is stored on a server device. The client device may also obtain a copy of the set of data from a server database. The copy of the set of data is stored on a client device. The client device may further obtain a set of mutations to one or more portions of the set of data. The client device may further modify the set of mutations based on the schema for the set of data. The client device may further apply the modified set of mutations to the copy of the set of data that is stored on the client device.

17 Claims, 7 Drawing Sheets

(56) References Cited

OTHER PUBLICATIONS

Apollo GraphQL, "Local-only Fields", indexed by the Internet Archive Wayback Machine on Jan. 25, 2021, 12 pages. (Year: 2021).*

Tucker, John, "Highly Functional Offline Applications Using Apollo Client", Codeburst blog post published on Jul. 28, 2019, 28 pages. (Year: 2019).*

"Client Side offline Dgraph GraphQL sync", Dgraph blog post published in Jan. 2021, 3 pages. (Year: 2021).*

Zuccarelli, Gianluca, "Offix 2.0", Medium blog post published Mar. 29, 2021, 11 pages. (Year: 2021).*

Stubailo, Sashko, "The Next Step for Realtime Data in GraphQL," Apollo Blog, Feb. 16, 2017, https://www.apollographql.com/blog/the-next-step-for-realtime-data-in-graphql-b564b72eb07b/.

Patterson, Maria, "Data Stream Processing for Newbies with KAFKA, KSQL, and POSTGRES," High Alpha, Apr. 6, 2019, https://highalpha.com/data-stream-processing-for-newbies-with-kafka-ksql-and-postgres/.

Touronen, Ville, "Microservice Architecture Patterns with GraphQL," Department of Computer Science, University of Helsinki, Mar. 24, 2019, Helsinki, Finland, https://helda.helsinki.fi/bitstream/handle/10138/304677/Touronen_Ville_Pro_gradu_2019.pdf?sequence=1.

* cited by examiner

```
type Note
{
    id: String!
    title: String
    description: String
    completed: Boolean
    comments: [Comment]
} type Comment
{
    id: String!
    title: String
    description: String
}
```

FIG. 2 ated herein, in accordance with some embodiments of
SCHEMA BASED DATA BUFFERING AND PROCESSING ON A CLIENT DEVICE

TECHNICAL FIELD

Aspects of the present disclosure relate to data stream processing systems, and more particularly, to schema based data buffering and processing on a client device.

BACKGROUND

Stream processing is a data technology that focuses on the real-time or near real-time processing of streams of data (e.g., data streams). It may be used to query data streams and receive changes to a set of data. These data streams and sets of data may be managed by a data streaming platform. The data streaming platform may use various tools and/or technologies such as distributed publish-subscribe messaging systems (e.g., the Apache Kafka™ system), distributed real-time computation systems (e.g., the Apache Storm™ system), and streaming data flow engines (e.g., the Apache Flink™ system). Stream processing systems may be implemented in a variety of architectures including a microservices architecture (e.g., the Red Hat™ OpenShift™ platform).

A client device may subscribe to certain types of events and/or data objects for a data streaming platform. This may allow the client device to receive changes or modifications to data objects or sets of data as these changes occur. The client device may update a local copy of the data to be consistent with the changes that were received via the subscription (e.g., to sync a local copy of the data with the data stored in the data streaming platform). In addition, a client device may also query the data streaming platform for changes that have occurred to data objects or to a set of data. This may allow the client device to manually request changes or modifications to data objects or sets of data. The client device may apply those changes to the local copy of the data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2 is a diagram that illustrates an example schema for data, in accordance with some embodiments of the disclosure.

DETAILED DESCRIPTION

As discussed above, a data streaming platform may process changes to data in real-time or near real-time. These changes to data (e.g., adding new data, removing data, updating data, etc.), may be provided to a client device via subscriptions and/or queries. For example, a client device may subscribe to certain types of events and/or data objects for a data streaming platform. As changes occur to certain types of data objects (e.g., as certain events occur), the data streaming platform may push (e.g., transmit) these changes to client devices that are subscribed. In addition, the data streaming platform may also receive a request (e.g., a query) for updates/changes to the data and the data streaming platform may transmit the update data to the client devices.

When a client device receives subscriptions (with updated data) and transmits requests (e.g., transmit queries) for updated data, the client device may receive duplicate data and/or may receive the data out of order. For example, a first update (e.g., mutation) may indicate that a first data object was modified and a second update may indicate that the first data object was created. The two updates were received out of order because the new data object cannot be modified until after the new object has been created. In addition, if a client device loses connection with the data streaming platform (e.g., a server device) and later reconnects, the client device may receive both subscribed data (e.g., data pushed to the client device based on subscriptions) and data that the client device sent queries for (e.g., delta queries). This may also result in duplicate and/or out of order data.

The present disclosure addresses the above-noted and other deficiencies by providing techniques for buffering mutations (e.g., modifications/changes to data) on the client device (e.g., client-side). The client device may analyze a schema (e.g., a format, layout, hierarchy) for the data and/or identifiers for the data affected by the mutations. This may allow the client device to reorder the mutations such that the data remains consistent with the data that is stored on the data streaming platform. This may also allow the client device to identify and remove duplicate mutations before applying the mutations to the local copy of the data. The client side buffering and modification of the mutations may allow the client device to keep a local copy of the data consistent (e.g., synced) with the data on the data streaming platform (e.g., data stored server-side) more quickly and/or efficiently. In addition, the client side buffering and modification of the mutations may allow the data streaming platform to operate more quickly and/or efficiently because the data streaming platform may not need to track mutations, reorder the mutations, and/or remove duplicate mutations when transmitting mutations to the client device.

Figure 1:
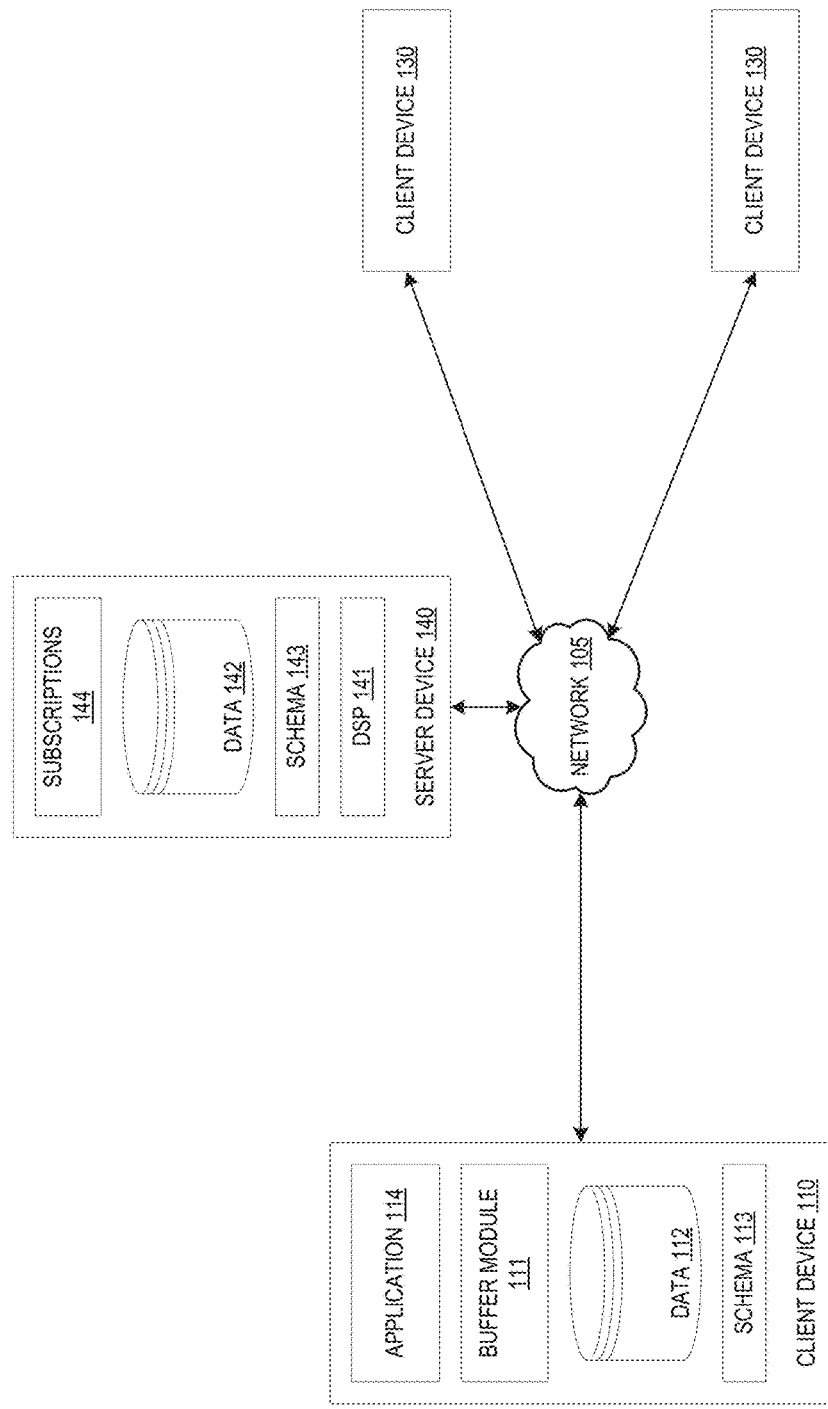
FIG. 1 is a block diagram that illustrates an example system, in accordance with some embodiments of the present disclosure.

FIG. 1 is a block diagram that illustrates an example system 100. As illustrated in FIG. 1, the system 100 includes a network 105, a client device 110, a plurality of client devices 130, a server device 140, and data 142. The client devices 110, 130, and server device 140 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc. In some embodiments, the network 105 may be an L3 network. The network 105 may carry communications (e.g., data, message, packets, frames, etc.) between client device 110, client devices 130, and server device 140.

Each client device 110, and 130, and server device 140 may include one or more computing devices. A computing device may include hardware such as processing device (e.g., processors, central processing units (CPUs)), memory (e.g., random access memory (e.g., RAM)), storage devices (e.g., hard-disk drive (HDD), solid-state drive (SSD), etc.—not shown), and other hardware devices (e.g., sound card, video card, etc.—not shown). In some embodiments, memory may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory may be configured for long-term storage of data and may retain data between power on/off cycles of the computing devices. Each computing device may comprise any suitable type of computing device or machine that has a programmable processor including, for example, server computers, desktop computers, laptop computers, tablet computers, smartphones, set-top boxes, etc. In some examples, each client device 110, and 130, and server device 140 may comprise a single machine or may include multiple interconnected machines (e.g., multiple servers configured in a cluster).

The client devices 110, and 130 may be implemented by a common entity/organization or may be implemented by different entities/organizations. For example, client device 110 may be operated by a first company/corporation and one or more client devices 130 may be operated by a second company/corporation. Each of client devices 110, and 130 may execute or include an operating system (OS), such as a host OS. The host OS of a client devices 110, and 130 may manage the execution of other components (e.g., software, applications, etc.) and/or may manage access to the hardware (e.g., processors, memory, storage devices etc.) of the computing device.

The server device 140 includes a data streaming platform (DSP) 141 and schema 143. The data 142 may be stored one or more data stores and/or data storage devices. For example, the data 142 may be stored on hard disk drives, solid state disk drives, optical drives, or other types of memory. Although the data 142 is illustrated as part of the server device 140, the data may be stored separate from the server device 140 in other embodiments. For example, the data 142 may be stored on a storage area network (SAN) that is communicatively coupled to the server device 140 (via network 105). In a further example, the data 142 may be stored on a cloud storage platform/service that is communicatively coupled to the server device 140 (via network 105).

In one embodiment, the schema 143 may be data/information that indicates the structure, organization, hierarchy, layout, format, etc., of the data 142. The schema 143 may define the different types of data and/or data objects that may be in data 142. For example, the schema 143 may define the types of tables, values of the fields in the tables, the types of data objects, etc., that are stored in the data 142. The schema 143 may also define the structure, organization, or the hierarchy of the data 142. For example, the schema 143 may indicate that a first data object includes one or more other types of data objects, as illustrated below in FIG. 2.

In one embodiment, the DSP 141 may manage access and/or updates to the data 142. For example, the DSP 141 may receive requests to read and/or access the data 142 (from client devices 110 through 130) and may provide the requested data to the client devices 110 through 130. The DSP 141 may publish, subscribe to, store, and/or process streams of data in real time or near real time (e.g., within a threshold period of time that the streams of data are received by the server device 140). The DSP 141 may handle data streams from multiple sources and deliver them to multiple clients. The sources and clients may be computing devices, such as client devices 110 through 130. The DSP 141 may be built into streaming data pipelines that share data between computing devices. In one embodiment, the DSP 141 may receive requests to subscribe to certain types of data objects and/or for certain types of events (e.g., certain types of modifications to data, such as adding, deleting, update, etc.). The DSP 141 may store these requests in the subscriptions 144. When certain mutations (e.g., modifications) are made to data objects, the DPS may push those mutations to the client device 110.

Client device 110 includes a buffer module 111, data 112 (e.g., local data stored on a local data storage or data storage device), schema 113, and application 114. In one embodiment, the data 112 may be a copy of the data 142 (that may be managed by the server device 140, as discuss in more detail below). For example, the data 112 may be a copy of a portion, subset, etc., of the data 142 that is stored in a memory of the client device 110 (e.g., is stored locally, is a local copy, etc.). The data 112 may include one or more data objects. A data object may be a logical unit of data. For example, a data object may be a file, a table, a row in a table, a column in a table, an entry/field in a table, etc. The data 112 may be managed by the buffer module 111, as discussed in more detail below. The data 112 may include the same data objects that are in data 142.

In one embodiment, the application 114 may be app, process, service, etc., that uses, accesses, and/or modifies the data 112. For example, the application 114 may be an inventory management application that may track and/or update the current inventory a set of products (e.g., parts for a vehicle, different toys, etc.). The application 114 may create new data objects, updated existing data objects, and/or delete existing data objects in the data 112. For example, the application 114 may change the value of a field in a table. In another example, the application 114 may create a new table or a new row in a table.

In one embodiment, the schema 113 may be data/information that indicates the structure, organization, hierarchy, layout, etc., of the data 112. The schema 113 may define the different types of data and/or data objects that may be in data 112. For example, the schema 113 may define the types of tables, values of the fields in the tables, the types of data objects, etc., that are stored in the data 112. The schema 113 may also define the organization or the hierarchy of the data 112. For example, the schema 113 may indicate that a first data object includes one or more other types of data objects, as illustrated below in FIG. 2. The schema 113 may be a subset of a portion of the schema 143. For example, the schema 143 may be data/information that indicates the structure, organization, hierarchy, layout, etc., of all of the data 142. The portion or subset of the data that is stored on the client device 110 (e.g., data 112) may include fewer types of data objects. Thus, the schema 113 may be a subset of the schema 143.

In one embodiment, the buffer module 111 may obtain the schema 113 for the data 112. For example, the buffer module 111 may request the schema 113 from the server device 140. In another example, the buffer module 111 may receive the schema 113 along with the data 112 from the server device 140. As discussed above, the schema 113 is for the data 112 that is stored on the client device.

In one embodiment, the buffer module 111 may also obtain the data 112 from the server device 140. For example, the buffer module 111 may request the data 112 from the server device 140 based on a request from the application 114 for the data 112. As discussed above, the data 112 may be a copy of a portion or a subset of data 142.

In one embodiment, the buffer module 111 may obtain (e.g., receive) a set of mutations to a portion of the data 112. A mutation may be a change, update, modification, etc., to the data 112. For example, a mutation may be an update to a field, entry, or other data object in the data 112. In another example, a mutation may be a new data object that is added to the data 112. In a further example, a mutation may be the removal or deletion of a field, entry, or data object in the data 112. In one embodiment, some or all of the set of mutations may be obtained based on one or more subscriptions 144 that are associated with the client device 110, as discussed in more detail below. In another embodiment, some or all of the set of mutations may be obtained based on one or more queries (e.g., delta queries) from the client devices 110, as discussed in more detail below.

In one embodiment, the buffer module 111 may buffer, temporarily store, cache, etc., mutations that are received from the server device 140. For example, the buffer module 111 may not apply the mutations to the data 112 but may store the mutations for a period of time. Storing or buffering the mutations for a period of time before applying the mutations may allow the buffer module 111 to reorder one or more of the mutations and/or to remove one or more duplicate mutations, as discussed in more detail below.

In one embodiment, the mutations in the set of mutations may be in an order such that applying the set of mutations to the data 112 may result in errors and/or inconsistencies in the data 112. For example, a mutation may modify a data object that has not yet been added to the data 112, as discussed in more detail below. In another embodiment, the mutations in the set of mutations may include duplicate mutations. For example, a newly added or created data object may be received via a subscription and also via a query, as discussed in more detail below.

The buffer module 111 may modify the set of mutations. In one embodiment, the buffer module 111 may reorder some of the mutations in the set of mutations (e.g., may change the order of the mutations in the set of mutations), as discussed in more detail below. This may allow the buffer module 111 to apply the mutations to the data 112 without resulting in errors and/or inconsistencies in the data 112. The buffer module 111 may reorder one or more mutations based on the schema 113 and/or identifiers for the data objects, as discussed in more detail below.

In another embodiment, the buffer module 111 may remove one or more duplicate mutations from the set of mutations, as discussed in more detail below. This may allow the buffer module 111 to apply the mutations to the data 112 without adding duplicate data objects to the data 112, or without resulting in duplicate modifications to a data object in the data 112. The buffer module 111 may remove one or more duplicate mutations based on the schema 113 and/or identifiers for the data objects, as discussed in more detail below.

In one embodiment, the buffer module 111 may apply the modified set of mutations (e.g., the set of mutations after it has been reordered and/or after duplicate mutations have been removed) to the data 112. For example, the buffer module 111 may add data objects based on the set of mutations. In another example, the buffer module 111 may remove/delete data objects based on the set of mutations. In a further example, the buffer module 111 may update a data object based on the set of mutations.

As discussed above, the buffer module 111 may obtain (e.g., receive) one or more mutations based on a query. For example, client devices 130 may have updated the data 142. The buffer module 111 may transmit a message or a request for updates to the portion of the data 142 that corresponds to the data 112. The message or request for the updates to the data 142 may be referred to as a query. In one embodiment, the buffer module 111 may transmit a type of query referred to as a delta query. A delta query may request updates or modifications to the data 142 that occurred after a specific time. For example, the delta query may indicate a specific time (e.g., may include a time a timestamp). The time (or timestamp) may indicate the last time the client device 110 received updates to the data 112 from the server device 140. The server device may transmit a set of mutations that includes updates to the data 142 that occurred after the time indicated in the delta query.

In one embodiment, the delta query allows the client device 110 to request only the differences between the data 112 and the data 142 (or to the associated portion of the data 142). For example, rather than requesting all of the data 142, the client device 110 may request just the differences between the data 112 and the data 142 that occurred after the time indicated in the delta query. This allows the client device 110 to synchronize or match the data 112 with the data 142 while using less network bandwidth and/or resources. For example, the server device 140 may transmit less data to client device 110 when compared to transmitting all of the data 142 to the client device 110.

As discussed above, the client device 110 may also obtain mutations to the data 112 based on one or more subscriptions 144. A subscription 144 may indicate events for the data 142 that should be monitored by the DPS 141. An event may be a mutation (e.g., a change or modification) to the data 142. For example, a subscription 144 may indicate that the DSP 141 should monitor the data 142 for creations of a certain type of data object (e.g., a certain type of event). A subscription 144 may also indicate which client devices are interested in different mutations. For example, a subscription 144 may indicate that the client device 110 is interested in updates to a particular field in a table. Unlike queries, subscriptions 144 may use an active connection between the client device 110 and the server device 140. For example, the server device 140 may use a Web Socket to maintain an active connection with the client device 110. This enables the server device 140 (e.g., DSP 141) to push events (e.g., mutations or modifications to data 142) to the client device 110. Subscriptions 144 provide the ability to inform the client device 110 of events or mutations asynchronously using application programming interfaces (APIs). Subscriptions 144 may also be used to notify the client 150 in real time about changes to the data 142, such as the creation of a new data object or updates to different data objects (e.g., different fields in a table). In this way, subscriptions 144 and the DSP 141 may allow developers to expose unstructured database changes as streams (e.g., data streams).

In one embodiment, the client device 110 may receive mutations based on the subscriptions 144 and/or based on delta queries after the client device 110 is disconnected from the server device 140. For example, the client device 110 may lose access to the network 105, may lose network connection, may not be in range of a cellular or Wi-Fi network, etc. The client device 110 may be unable to maintain an active connection (e.g., via Web Sockets) with the server device 140. At a later point in time, the client device 110 may be able to reconnect to the server device 140 (e.g., the client device may reestablish an active connection with the server device 140). The buffer module 111 may determine that the client device 110 was disconnected and has reconnected with the server device 140. The buffer module 111 may obtain the mutations via subscriptions and/or via delta queries after the client device 110 has reconnected with the server device 140. For example, after the client device 110 has reconnected with the server device 140, the buffer module 111 may begin to receive mutations based on one or more of the subscriptions 144. In another example, after the client device 110 has reconnected with the server device 140, the buffer module 111 may transmit a delta query to the server device 140 and receive one or more mutations in response to the delta query.

In one embodiment, one or more mutations to the data 112 may have occurred while the client device 110 was disconnected from the server device 140. For example, a new data object may have been added to the data 112. In another example, an existing data object may have been modified or updated. When the client device 110 reconnects to the server device 140, the mutations that occurred while the client device 110 was disconnected from the server device 140 may be transmitted to the server device 140 so that the server device 140 (e.g., the DSP 141) may apply the mutations (that originated or occurred at the client device 110) to the data 142. As discussed above, the buffer module 111 may also receive mutations from the server device 140 based on a subscription 144 or a delta query.

In one embodiment, the buffer module 111 may reorder and/or de-duplicate mutations based on one or more identifiers for the data objects. For example, the buffer module 111 may compare identifiers for data objects affected by the mutations. If the identifiers match (e.g., are identical), the buffer module 111 may determine that one of the mutations may be a duplicate mutation. In another example, the buffer module 111 may assign a client or temporary identifier to a new data object that is created when the client device 110 is disconnected from the server device 140. The buffer module 111 may associate the client or temporary identifier with the identifier provided by the server device 140 (e.g., a server identifier) when the server device 140 adds the new data object to the data 142. This may allow the buffer module 111 to detect a duplicate mutation that may add the same new data object a second time if the mutation is received via a subscription or delta query, as discussed in more detail below.

As discussed above, the client device 110 (e.g., buffer module 111) may be aware of the schema 113 for the data 112. The schema 113 allows the buffer module 111 to be aware of the format of the data 112, hierarchies or dependencies in the data 112, fields of the data 112, identifiers of data objects, etc. By using the schema 113 and/or the identifiers of the data objects, the buffer module 111 may be able to reorder mutations and remove duplicate mutations on the client side. This allows the client device 110 to keep the data 112 consistent with the data 142 without using or relying on the server device 140 to perform the reordering and/or deduplication.

FIG. 2 is a diagram that illustrates an example schema 200 for data, in accordance with some embodiments of the disclosure. The schema 200 may be defined using a query language. The query language may define the structure, contents, layout, format, hierarchy, etc., of the various data objects that may be used by a data processing system, such as system 100 illustrated in FIG. 1. In one embodiment, the query language may be GraphQL.

The schema 200 also defines a first type of data object, the Comment data object 220. The Comment data object 220 includes an identifier field (e.g., id) which may be an alphanumeric string. The Comment data object 220 also includes a title field (e.g., title) which may be an alphanumeric string. The Comment data object 220 further includes a description field (e.g., description) which may be an alphanumeric string.

The schema 200 defines a second type of data object, the Note data object 210. The Note data object 210 includes an identifier field (e.g., id) which may be an alphanumeric string. The Note data object 210 also includes a title field (e.g., title) which may be an alphanumeric string. The Note data object 210 further includes a description field (e.g., description) which may be an alphanumeric string. The Note data object 210 also includes a completed field (e.g., completed) which may have a Boolean value (e.g., may be true or false, may be 1 or 0, etc.). Lastly, the Note data object 210 may include one or more Comment data objects 220.

As illustrated in FIG. 2, the schema 200 defines the contents (e.g., fields) of the Note and Comment data objects. For example, the schema 200 indicates the Note and Comment data objects each have an identifier. In addition, the schema 200 defines the hierarchy of the Note and Comment data objects. For example, the schema 200 indicate that the Note data object 210 includes one or more Comment data objects 220 (e.g., the Comment data object 220 is part of the Note data object 210).

Figure 3:
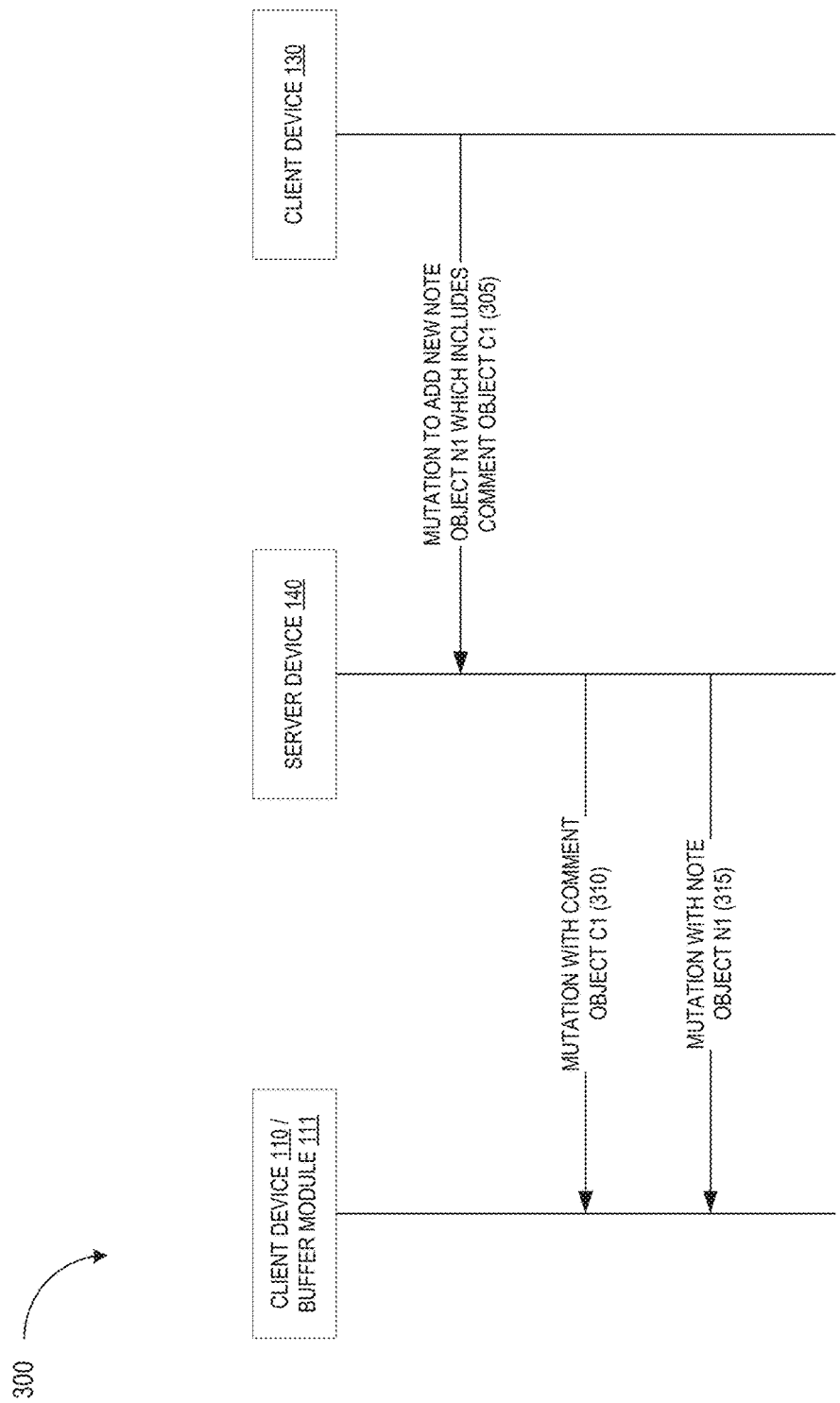
FIG. 3 is a sequence diagram that illustrates an example scenario where mutations may be received out of order, in accordance with some embodiments of the present disclosure.

FIG. 3 is a sequence diagram 300 that illustrates an example scenario where mutations may be received out of order, in accordance with some embodiments of the present disclosure. As discussed above in conjunction with FIG. 1, a client device 130 may send one or more mutations to the server device 140 at operation 305. For example, a client device 130 may add a new Note object N1. The Note object N1 may include a Comment object C1 (as illustrated in FIG. 2).

The client device 110 may receive a mutation with the Comment object C1 at operation 310. The client device 110 may also receive a mutation with the Note object N1 at operation 315. Thus, the Comment object C1 was received before the Note object N1. This may cause the client device 110 to apply the mutations to data 112 (e.g., the local copy of the data 142) in an incorrect order. For example, the client device 110 may attempt to add a Note object to the data 112 but the corresponding Comment object C1 (which includes the Note object N1) has not been added to the data 112. The mutations that are received at operations 310 and 315 may be received based on subscriptions and/or delta queries.

In one embodiment, the buffer module 111 may buffer and reorder the mutations that were received from the server device 140. For example, the buffer module 111 may not immediately apply mutations that are received from the server device 140. Instead, the buffer module 111 may store (e.g., temporarily store, buffer, cache, etc.) the mutations that were received at operations 310 and 315. The buffer module 111 may analyze a schema for the data objects (e.g., schema 200 illustrated in FIG. 2), the mutations, and/or identifiers (or other data/metadata) for the data objects affected by the mutations. Based on the schema and/or the identifiers for the data objects, the buffer module 111 may reorder the mutations that were received in operations 310 and 315. For example, rather than applying the mutation to add Note object N1 first, the buffer module 111 may apply the mutation to add the Comment object C1 first, because the schema may indicate that a Note object should be included as part of a comment object. The buffer module 111 may also analyze identifiers to determine that the Note object N1 is part the Comment object C1. For example, the buffer module 111 may determine that the identifier (e.g., id field) of the Comment object C1 is the same as the identifier for the comment object that is part of the Note object N1. This may allow the buffer module 111 to determine that the mutation for Note object N1 should be applied before the mutation for Comment object C1 is applied (e.g., to add the Comment object C1 first).

Figure 4:
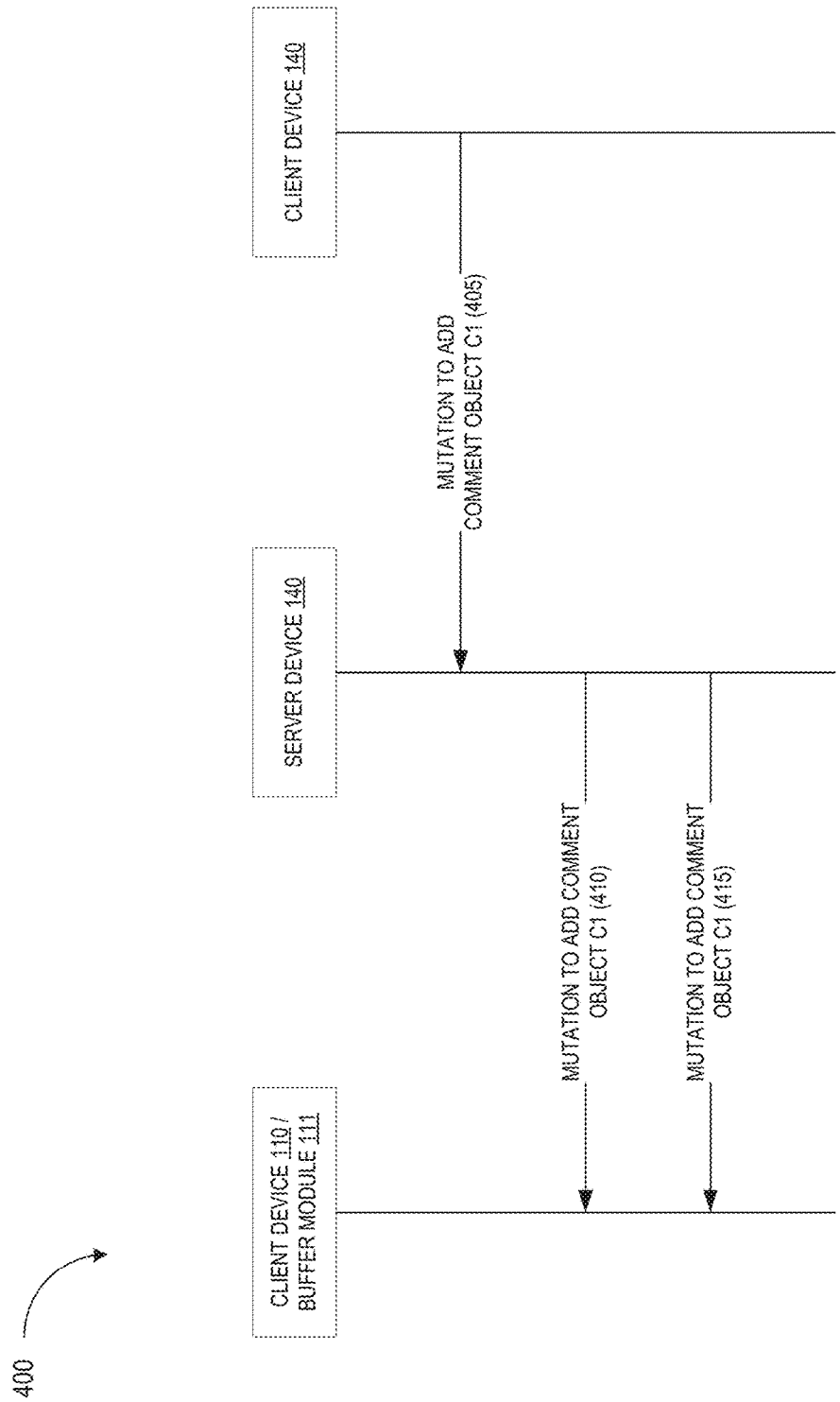
FIG. 4 is a sequence diagram that illustrates an example scenario where duplicate mutations may be received, in accordance with some embodiments of the present disclosure.

FIG. 4 is a sequence diagram 400 that illustrates an example scenario where duplicate mutations may be received, in accordance with some embodiments of the present disclosure. As discussed above in conjunction with FIG. 1, a client device 130 may send one or more mutations to the server device 140 at operation 405. For example, a client device 130 may add a new Comment object C1.

The client device 110 may receive a mutation with the new Comment object C1 at operation 410. The client device 110 may also receive a mutation with the new Comment object C1 at operation 415. The mutation received at operation 410 may be based on a subscription and the mutation received at operation 415 may be based on a delta query, or vice versa. This may cause the client device 110 to apply duplicate mutations to the data 112. For example, the client device 110 may attempt to add Comment object C1 to the data 112 twice.

In one embodiment, the buffer module 111 remove one or more duplicate mutations. For example, the buffer module 111 may not immediately apply mutations that are received from the server device 130. Instead, the buffer module 111 may store (e.g., temporarily store, buffer, cache, etc.) the mutations that were received at operations 410 and 415. The buffer module 111 may analyze a schema for the data objects (e.g., schema 200 illustrated in FIG. 2), the mutations, and/or identifiers (or other data/metadata) for the data objects affected by the mutations. Based on the schema and/or the identifiers for the data objects, the buffer module 111 may remove, delete, etc., one or more mutations. For example, the buffer module 111 may analyze the identifiers for the Comment object received at operation 410 and for the Comment object received at operation 415. The buffer module 111 may determine that the identifiers for the two Comment objects are identical and may determine that one of the mutations is a duplicate mutation. The buffer module 111 may select one of the mutations received at operations 410 and 415 and may discard, delete, remove, etc., that mutation (e.g., may not apply the duplicate mutation).

Figure 5:
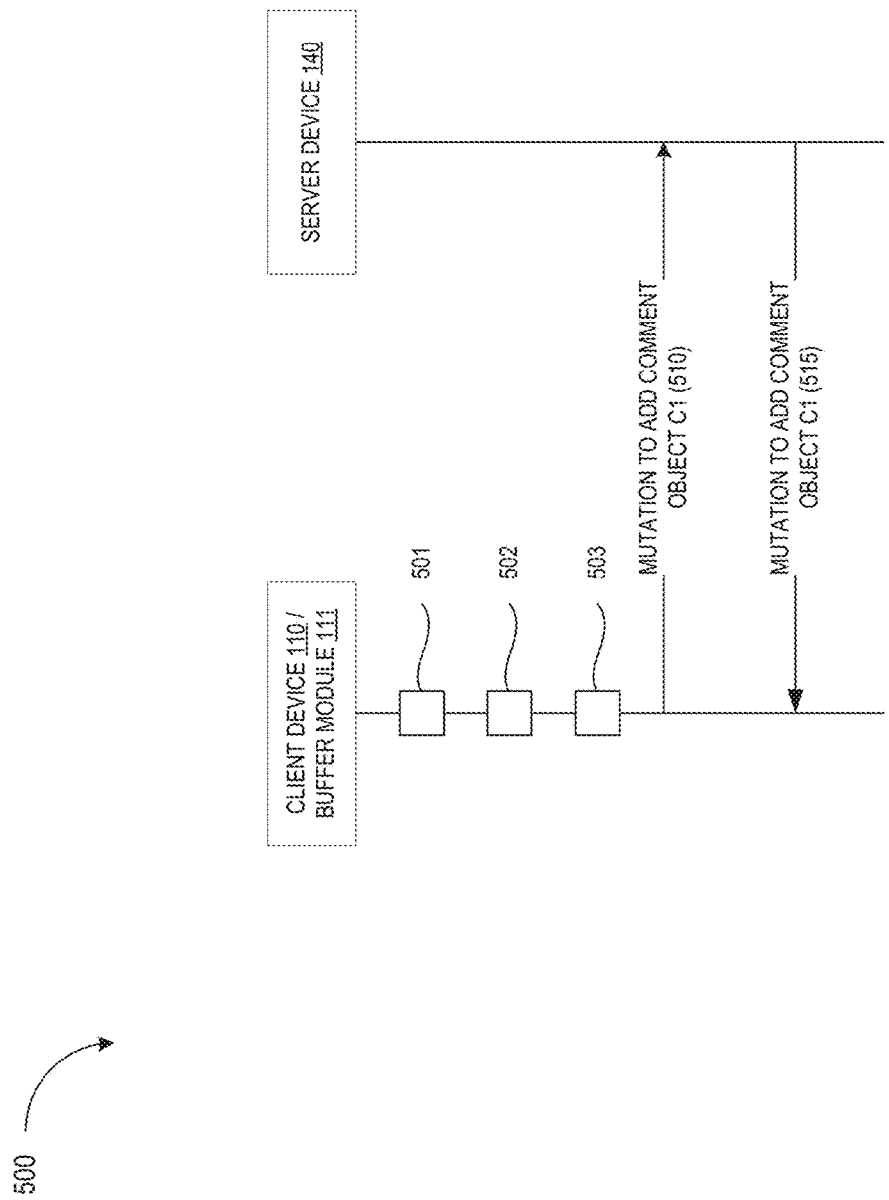
FIG. 5 is a sequence diagram that illustrates an example scenario where duplicate mutations may be received, in accordance with some embodiments of the present disclosure.

FIG. 5 is a sequence diagram 500 that illustrates an example scenario where duplicate mutations may be received, in accordance with some embodiments of the present disclosure. As discussed above in conjunction with FIG. 1, the client device 110 may become disconnected from the server device 140 at operation 501. At operation 502, the client device 110 may add a new Comment object C1 to the local data stored on the client device 110. Because the client device 110 is not connected to the server device 140 (e.g., the client device 110 is offline), the addition of Comment object C1 may not be transmitted to the server device 140. The buffer module 111 may assign or associate the new Comment object C1 with a first identifier (e.g., a client identifier, a local identifier, a temporary identifier). At operation 503, the client device 110 may reconnect with the server device. When the Comment object C1 is added to the data 142 by the server device 140, the server device 140 may provide the client device 110 with a second identifier (e.g., a server identifier, a final identifier, etc.) for the Comment object C1. The buffer module 111 may associate the first identifier with the second identifier, or may replace the first identifier with the second identifier.

At operation 510, the client device 110 may transmit new Comment object C1 (e.g., a mutation) to the server device 140 so that the server device 140 can add the new Comment object C1 to the data 142. At operation 515, the client device may receive the same Comment object C1 from the server device 515. The Comment object C1 received at operation 515 may be based on a subscription and/or a delta query transmitted by the client device 110 when the client device 110 reconnected to the server device 140. This may cause the client device 110 to add the Comment object C1 to the local data twice (e.g., once at operation 502 and once at operation 515).

In one embodiment, the buffer module 111 may remove one or more duplicate mutations. For example, the buffer module 111 may not immediately apply mutations that are received from the server device 130. Instead, the buffer module 111 may store (e.g., temporarily store, buffer, cache, etc.) the mutation (e.g., Comment object C1) that was received at operation 515. The buffer module 111 may analyze a schema for the data objects (e.g., schema 200 illustrated in FIG. 2), the mutations, and/or identifiers (or other data/metadata) for the data objects affected by the mutations. Based on the schema and/or the identifiers for the data objects, the buffer module 111 may remove, delete, etc., one or more mutations. For example, the buffer module 111 may analyze the identifiers for the Comment object received at operation 515 and for the Comment object C1 received at operation 415. The buffer module 111 may determine that the identifier for the Comment object C1 received at operation 515 is identical to the second identifier received at operation 503. The buffer module 111 may determine that the mutation to add Comment object C1 receive at operation 515 is a duplicate of the Comment object C1 that was added at operation 502. The buffer module 111 may discard, delete, remove, etc., the mutation to add Comment object C1 that was received at operation 515 (e.g., may not apply the duplicate mutation).

Figure 6:
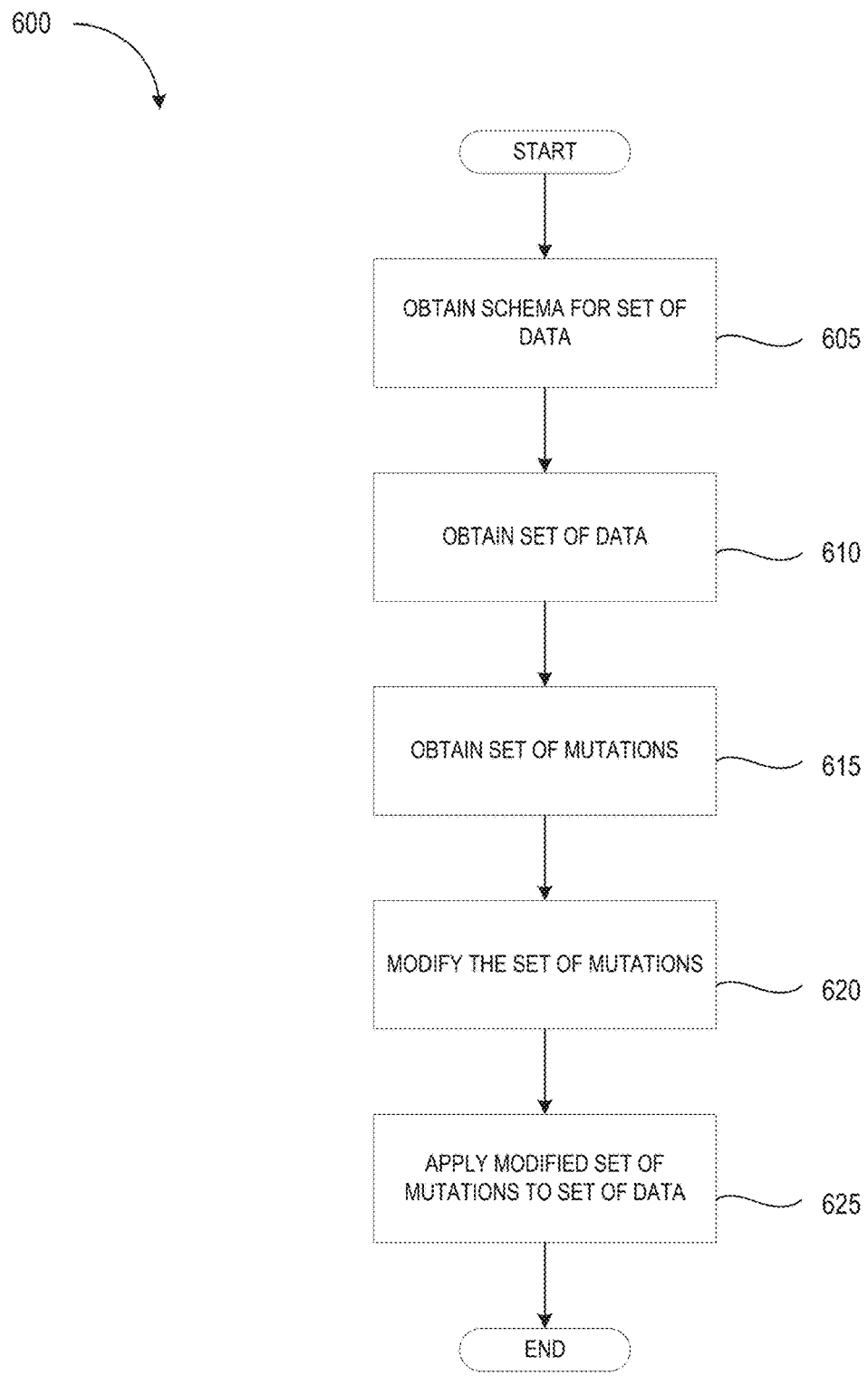
FIG. 6 is a flow diagram of a method of modifying mutations, in accordance with some embodiments of the present disclosure.

FIG. 6 is a flow diagram of a method 600 of modifying mutations, in accordance with some embodiments of the present disclosure. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by client device (e.g., client device 110 illustrated in FIG. 1), a buffer module (e.g., buffer module 111 illustrated in FIG. 1), and/or a computing device.

At block 605, the method 600 may obtain a schema for a set of data from a server device. For example, the method

600 may transmit a request for the schema or the schema may be received along with the set of data. At block 610, the method 600 may obtain the set of data from a server device. For example, the method 600 may download, receive, etc., a copy of the set of data from the server device.

At block 615, the method 600 may receive a set of mutations from the server device. The set of mutations may be received based on one or more of a subscription and a delta query. For example, the set of mutations may include mutations sent to the client device based on a subscription and/or sent to the client device based on a delta query from the client device. The set of mutations may also be received after the client device disconnects from the server device and reconnects with the server device.

At block 620, the method 600 may modify the set of mutations. For example, the method 600 may reorder one or more mutations in the set of mutations, as discussed above. In another example, the method 600 may remove one or more duplicate mutations, as discussed above. The method 600 may modify the set of mutations based on the schema and/or based on identifiers for data objects in the set of data. At block 625, the method 600 may apply the modified set of mutations to the set of data.

Figure 7:
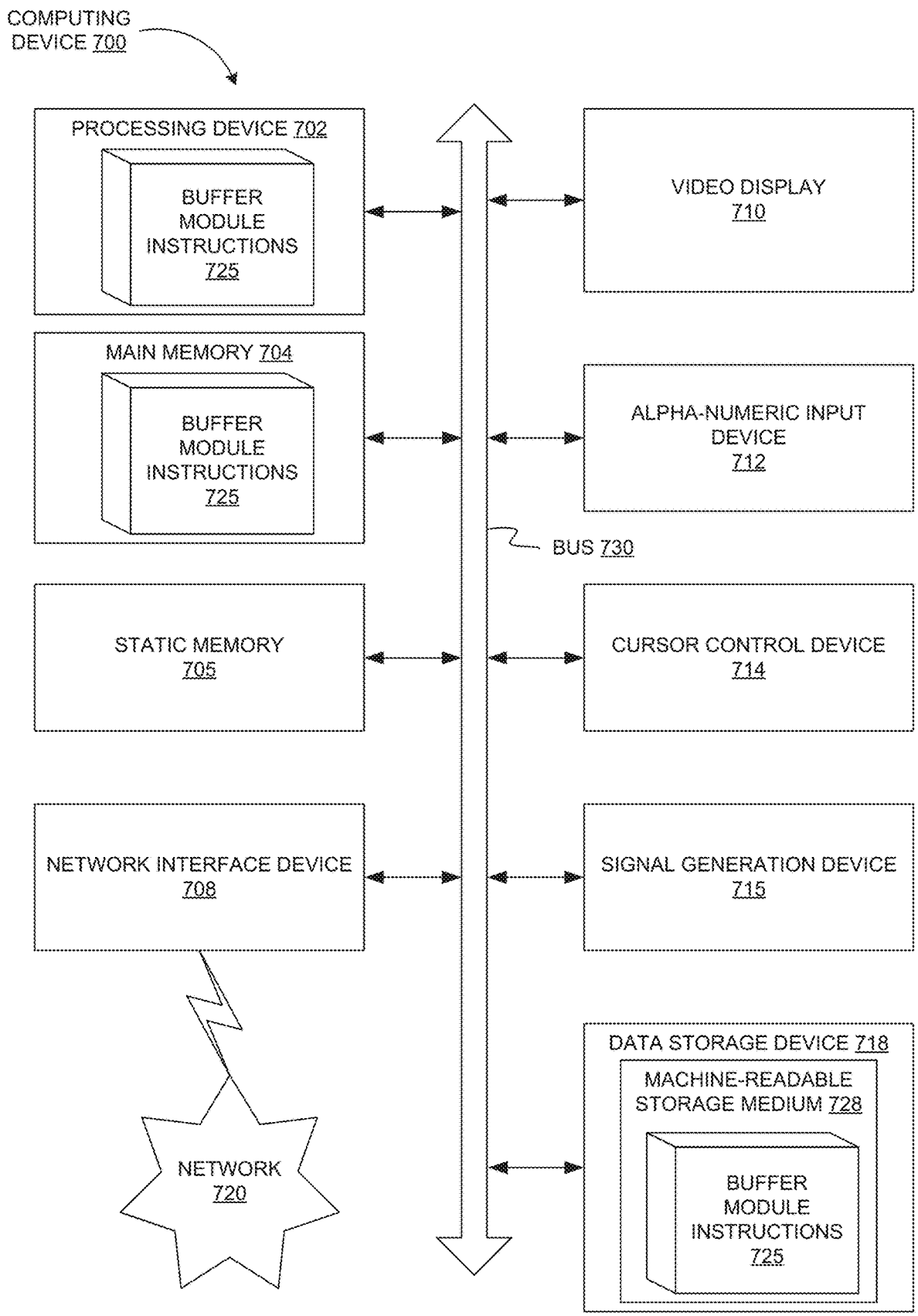
FIG. 7 is a block diagram of an example computing device that may perform one or more of the operations described herein, in accordance with some embodiments of the present disclosure.

FIG. 7 illustrates a diagrammatic representation of a machine in the example form of a computer system 700 within which a set of instructions, for causing the machine to perform any one or more of the methodologies discussed herein for specifying a stream processing topology (dynamically creating topics, interacting with these topics, merging the topics, reading from the topics, and obtaining dynamic insights therefrom) via a client-side API without server-side support. The machine may generate a schema at a client-side application using a query language, wherein the schema comprises one or more mutations that collectively define a data stream and can be executed by a server-side run time corresponding to the query language. A stream processor registry acting as a server-side run time corresponding to the query language may receive the schema from the client and store the mutations as metadata that defines a stream processing topology. The stream processor registry may read one or more topics provided by a data streaming platform to obtain data relevant to the data stream based on the one or more mutations and generate a user-specific topic comprising the data relevant to the data stream. The stream processor registry may perform these functions in response to receiving a subscription call to the user-specific topic. In addition, the stream processor registry may filter the data relevant to the data stream based on one or more of: offset rules, filtering rules, aggregation rules, and windowing rules specified by the call. In this way, a target topic comprising the portions of the data relevant to the data stream may be generated and the portions of the data relevant to the data stream may be provided to the client.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute buffer module instructions 725, for performing the operations and steps discussed herein.

The data storage device 718 may include a machine-readable storage medium 728, on which is stored one or more sets of buffer module instructions 725 (e.g., software) embodying any one or more of the methodologies of functions described herein. The buffer module instructions 725 may also reside, completely or at least partially, within the main memory 704 or within the processing device 702 during execution thereof by the computer system 700; the main memory 704 and the processing device 702 also constituting machine-readable storage media. The buffer module instructions 725 may further be transmitted or received over a network 720 via the network interface device 708.

The machine-readable storage medium 728 may also be used to store instructions to perform a method for specifying a stream processing topology (dynamically creating topics, interacting with these topics, merging the topics, reading from the topics, and obtaining dynamic insights therefrom) via a client-side API without server-side support, as described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "obtaining," "modifying," "applying," "transmitting," "receiving," "determining," "removing," "reordering," ",", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    obtaining a schema for a set of data comprising data objects, wherein the schema comprises a hierarchy and data types of the set of data, wherein the set of data is stored on a server device;
    obtaining a local copy of the set of data from the server device, wherein the local copy of the set of data is stored on a client device;

losing communications between the server device and the client device;

obtaining a set of mutations in a sequence, at the client device, to a plurality of the data objects in the set of data;

determining whether application of the set of mutations in the sequence to the set of data would result in data errors or data inconsistencies based on the schema;

in response to the determining that data errors or data inconsistencies would result, modifying, by the client device, the set of mutations based on the schema for the set of data, wherein the modifying comprises:

reordering the sequence of the set of mutations based on the schema, and replacing a client device first identifier associated with each mutation of the set of mutations, with a server device second identifier associated with the mutation;

applying the modified set of mutations to the local copy of the set of data;

reestablishing communications between the server device and the client device; and transmitting, to the server device, the modified set of mutations to the server device.

2. The method of claim 1, wherein obtaining the set of mutations comprises:

transmitting a delta query to the server device; and receiving the set of mutations based on the delta query.

3. The method of claim 2, wherein:

the delta query indicates a last time when the client device last updated the local copy of the set of data with the set of data, and the set of mutations comprises updates to the set of data that have occurred since the last time.

4. The method of claim 1, wherein obtaining the set of mutations comprises receiving the set of mutations from the server device based on one or more subscriptions of the client device.

5. The method of claim 1, wherein obtaining the set of mutations occurs in response to a determination that communications between the server device and the client device were lost.

6. The method of claim 1, wherein modifying the set of mutations further comprises removing one or more duplicate mutations from the set of mutations.

7. The method of claim 1, wherein the schema for the set of data is defined using a query language corresponding to the server device.

8. The method of claim 7, wherein the query language comprises GraphQL.

9. A client device, comprising:

a memory to store a local copy of a set of data; and a processing device operatively coupled to the memory, the processing device to:

obtain a schema for a set of data comprising data objects, wherein the schema comprises a hierarchy and data types of the set of data, wherein the set of data is stored on a server device;

obtain the local copy of the set of data from the server device, wherein the local copy of the set of data is stored on a client device;

lose communications between the server device and the client device;

obtain a set of mutations in a sequence, at the client device, to a plurality of the data objects in the set of data;

determine whether application of the set of mutations in the sequence to the set of data would result in data errors or data inconsistencies based on the schema;

in response to the determination that data errors or data inconsistencies would result, modify, by the client device, the set of mutations based on the schema for the set of data, wherein to modify comprises:

reorder the sequence of the set of mutations based on the schema, and replace a client device first identifier associated with each mutation of the set of mutations with a server device second identifier associated with the mutation;

apply the modified set of mutations to the local copy of the set of data;

reestablish communications between the server device and the client device; and transmit the modified set of mutations to the server device.

10. The client device of claim 9, wherein to obtain the set of mutations comprises:

transmit a delta query to the server device; and receive the set of mutations based on the delta query.

11. The client device of claim 10, wherein:

the delta query indicates a last time when the client device last updated the local copy of the set of data with the set of data, and the set of mutations comprises updates to the set of data that have occurred since the last time.

12. The client device of claim 9, wherein to obtain the set of mutations comprises receive the set of mutations from the server device based on one or more subscriptions of the client device.

13. The client device of claim 9, wherein to obtain the set of mutations occurs in response to a determination that communications between the server device and the client device were lost.

14. The client device of claim 9, wherein to modify the set of mutations further comprises remove one or more duplicate mutations from the set of mutations.

15. The client device of claim 9, wherein the schema for the set of data is defined using a query language corresponding to the server device.

16. The client device of claim 15, wherein the query language comprises GraphQL.

17. A non-transitory computer-readable medium, having instructions stored thereon which, when executed by a processing device, cause the processing device to:

obtain a schema for a set of data comprising data objects, wherein the schema comprises a hierarchy and data types of the set of data, wherein the set of data is stored on a server device;

obtain a local copy of the set of data from the server device, wherein the local copy of the set of data is stored on a client device;

lose communications between the server device and the client device;

obtain a set of mutations in a sequence, at the client device, to a plurality of the data objects in the set of data;

determine whether application of the set of mutations in the sequence to the set of data would result in data errors or data inconsistencies based on the schema;

in response to the determination that data errors or data inconsistencies would result, modify, by the client device, the set of mutations based on the schema for the set of data, wherein to modify comprises:

reorder the sequence of the set of mutations based on the schema, and replace a client device first identifier associated with each mutation of the set of mutations with a server device second identifier associated with the mutation;

apply the modified set of mutations to the local copy of the set of data;

reestablish communications between the server device and the client device; and transmit the modified set of mutations to the server device.

\* \* \* \* \*